US011340148B2

(12) United States Patent
Colin et al.

(10) Patent No.: US 11,340,148 B2
(45) Date of Patent: May 24, 2022

(54) SYSTEM AND METHOD FOR AUTOMATICALLY MIXING SOLUTIONS

(71) Applicant: BIOMÉRIEUX, Marcy l'Etoile (FR)

(72) Inventors: Bruno Colin, Marcy l'Etoile (FR); Audrey Miltcheff, Charbonnières les Bains (FR)

(73) Assignee: BIOMERIEUX, Marcy l'Etoile (FR)

( * ) Notice: Subject to any disclaimer, the term of this patent is extended or adjusted under 35 U.S.C. 154(b) by 613 days.

(21) Appl. No.: 16/079,045

(22) PCT Filed: Mar. 8, 2017

(86) PCT No.: PCT/FR2017/050509
§ 371 (c)(1),
(2) Date: Aug. 22, 2018

(87) PCT Pub. No.: WO2017/153679
PCT Pub. Date: Sep. 14, 2017

(65) Prior Publication Data
US 2019/0049350 A1 Feb. 14, 2019

(30) Foreign Application Priority Data
Mar. 10, 2016 (FR) ...................................... 1651989

(51) Int. Cl.
*G01N 1/38* (2006.01)
*G01N 13/00* (2006.01)

(52) U.S. Cl.
CPC ......... *G01N 1/38* (2013.01); *G01N 2013/006* (2013.01)

(58) Field of Classification Search
None
See application file for complete search history.

(56) References Cited

U.S. PATENT DOCUMENTS

| 3,363,468 A * | 1/1968 | Blades ................. B01L 3/0255 |
| | | 73/864.51 |
| 4,681,858 A | 7/1987 | Chaudhari et al. |
| 5,594,183 A * | 1/1997 | Colin ................... B01L 3/0293 |
| | | 73/864.52 |
| 5,765,490 A * | 6/1998 | Colin ....................... A61L 2/04 |
| | | 110/236 |

(Continued)

FOREIGN PATENT DOCUMENTS

| FR | 1 457 933 A | 11/1966 |
| FR | 2 623 283 A1 | 5/1989 |

OTHER PUBLICATIONS

Jun. 8, 2017 International Search Report issued in International Patent Application No. PCT/FR2017/050509.

(Continued)

*Primary Examiner* — Lore R Jarrett
(74) *Attorney, Agent, or Firm* — Oliff PLC

(57) ABSTRACT

A system for mixing solutions includes: a first container and at least one second container capable of containing solutions, each second container being capable of entirely containing the first container; means for displacing the first container and/or each second container capable of entirely immersing the first container in each second container; and rotational drive means for the first container so as to mix the solutions present in the first and second containers when the first container is entirely immersed in the solution present in the second container.

16 Claims, 5 Drawing Sheets

(56) References Cited

U.S. PATENT DOCUMENTS

| | | | | |
|---|---|---|---|---|
| 5,773,305 A * | 6/1998 | Zabetakis | ........... | B01F 11/0071 |
| | | | | 422/514 |
| 7,459,128 B2 * | 12/2008 | Karg | ................... | B01F 11/0071 |
| | | | | 222/133 |
| 2007/0020720 A1 * | 1/2007 | Colin | ....................... | C12Q 1/04 |
| | | | | 435/34 |
| 2010/0047898 A1 * | 2/2010 | Bishop | ................ | B01F 11/0074 |
| | | | | 435/252.1 |

OTHER PUBLICATIONS

Jun. 8, 2017 Written Opinion of the International Searching Authority issued in International Patent Application No. PCT/FR2017/050509.

* cited by examiner

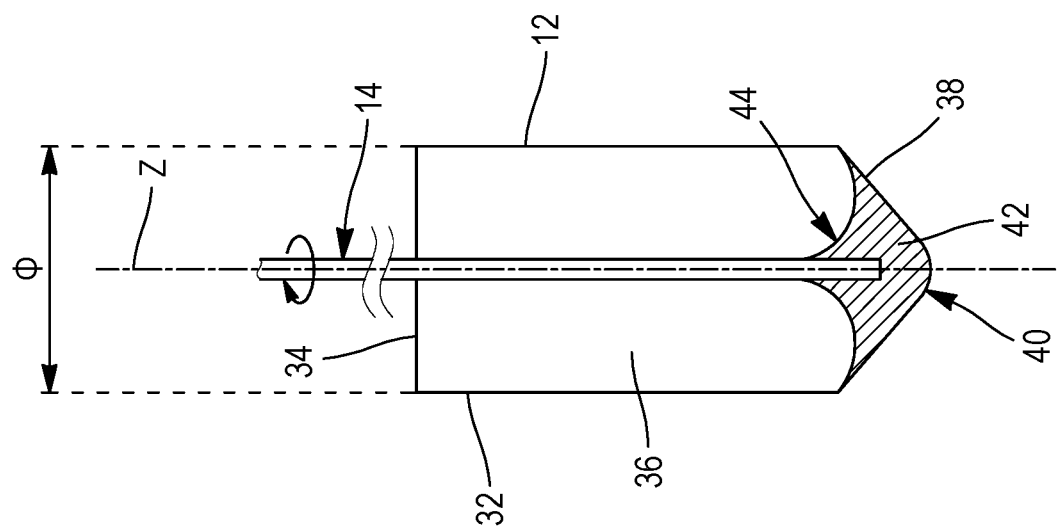

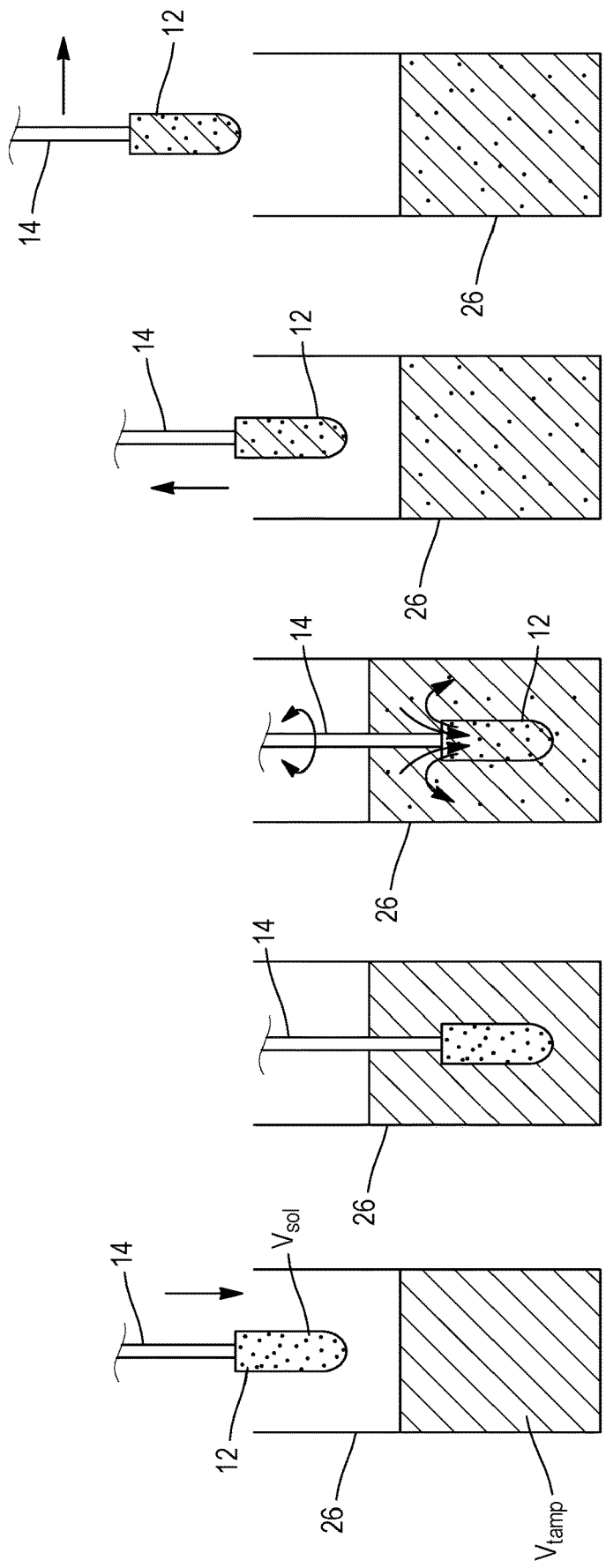

SYSTEM AND METHOD FOR AUTOMATICALLY MIXING SOLUTIONS

FIELD OF THE INVENTION

The present invention relates to the field of devices for mixing solutions, in particular devices for diluting a solution.

The present invention is in particular applied in the field of in vitro diagnosis, in particular in the field of biological analysis.

BACKGROUND OF THE INVENTION

Biological analysis of a sample most often entails the production of a solution, which itself is obtained from mixing a plurality of solutions and/or obtained following dilution of a solution, in particular in dilution buffers.

In particular, in biological analysis laboratories, the preparation of dilute solutions is time-consuming and generates little value added. In particular, a laboratory technician spends a good proportion of his/her time filling dilution tubes, pipetting solutions, introducing the pipetted solutions into the dilution tubes and homogenizing the mixed solutions using a stirrer. These manual operations make the technician unavailable for carrying out higher value added tasks, in particular carrying out the biological analyses themselves.

SUMMARY OF THE INVENTION

The object of the present invention is to propose a system which enables automatic mixing and homogenization of solutions.

The invention provides to this end a system for mixing solutions comprising:
- a first container and at least one second container capable of containing solutions, each second container being capable of entirely containing the first container;
- displacement means for the first container and/or each second container capable of entirely immersing the first container in each second container; and
- rotational drive means for the first container so as to mix the solutions present in the first and second containers when the first container is entirely immersed in the solution present in the second container.

The first container advantageously has a solid cylindrical and/or conical internal wall.

In other words, mixing two solutions involves filling the first and second containers and then immersing the first container in the second container. Mixing and homogenization of the solutions being performed automatically by setting the first container in rotation without using a stirrer. Mixed solutions are therefore available in the second containers to the laboratory technician and/or to other automated instruments linked to the system according to the invention.

According to one embodiment, the first container has an internal volume for filling with solution of between 1 milliliter and 5 milliliters, preferably of between 1 milliliter and 3 milliliters.

According to one embodiment, the first container has an internal volume for the solution of between 1 milliliter and 2 milliliters and a circular opening for introducing the solution of between 8.5 millimeters and 13 millimeters. Alternatively or additionally, the stem comprises a washer arranged above the cup. Each of these features make it possible to tilt the cup without any risk of spilling its content.

According to one embodiment, the system comprises a plurality of second containers, the displacement means being capable of immersing the first container in succession in the second containers. In other words, by passing the first container in succession into the second containers, without emptying between passes, the solution initially present in the first container is mixed with all the solutions present in the second containers. Furthermore, unlike a prior art dilution which conventionally uses a pipette tip for each mixing operation, the first container is effectively rinsed due to the rotation. There is no need to change it before carrying out the following mixing operation. Considerable savings in consumables are thus achieved.

In particular, the system comprises means for filling the first container with a solution for dilution and means for filling each second container with a dilution buffer. In other words, passing the first container in succession into the second containers involves a serial dilution of the solution initially present in the first container. In particular, by filling the second containers, which are for example identical, with a specific volume of dilution buffer and by selecting a first container, the volume of which is equal to $\frac{1}{9}^{th}$ of the volume of dilution buffer, a decimal serial dilution of the initial solution in the first container is obtained.

According to one embodiment, the first container comprises an opening for introducing the solution and the rotational drive means comprise:
- a stem passing through the opening in the first container, said stem being integral with an internal wall of the first container; and
- a motor connected to a second end of the stem and configured to drive the latter in rotation.

In other words, mixing and homogenization are achieved thanks to a "simple" cup equipped with a stem connected to a motor. In particular, if the cup, which is of simple manufacture, has just one opening in its upper part, the arrangement of this opening does not prevent effective mixing and homogenization of the solutions.

In particular, the stem is removably connected to the motor. The assembly formed by the first container and the stem thus constitute an interchangeable consumable, which may therefore be removed from the system for cleaning or may be single-use.

In particular, the first container comprises an axis of symmetry on which the stem is positioned.

According to one variant, the stem comprises a washer arranged above the first container which limits the risk of spillage when the cup is tilted.

According to one embodiment, the first container a part with rotational symmetry having an opening in the upper part and having a frustoconical or conical portion in the lower part. The conical or frustoconical part of the first container allows easier introduction of the first container into the solution present in a second container as well as effective wiping of a drop which hangs down from the first container when it is withdrawn from the second container.

The invention also provides a method for mixing solutions, comprising:
- filling a first container and at least one second container with solutions for mixing, each second container being capable of entirely containing the first container;
- for each second container, mixing the solution present therein and the solution present in the first container by:

placing the first container entirely in each second container such that the first container is entirely immersed in the solution present in the second container;

and setting the first container in rotation and/or stirring the first container so as to mix the solutions present in the first and the second containers.

The first container advantageously has a solid cylindrical and/or conical internal wall. In particular, the first container has an internal volume for filling with solution of between 1 milliliter and 5 milliliters.

According to one embodiment, mixing of the solution present in the first container in succession with the solutions present in the second containers.

According to one embodiment, each second container is filled with a predetermined volume of solution, and the volumetric capacity of the first container is equal to $\frac{1}{5}^{th}$ of said volume.

According to one embodiment, the first container is filled with a solution for dilution and each second container is filled with a dilution buffer.

The invention also provides a device for mixing solutions, comprising:
a container having an opening for introducing a solution; and
a stem passing through the opening of the container, said stem being integral with an internal wall of the first container and being configured to be connected to a motor to set it in rotation.

The first container advantageously has a solid cylindrical and/or conical internal wall. In particular, the first container has an internal volume for filling with solution of between 1 milliliter and 5 milliliters.

The invention also provides a system for mixing solutions, comprising:
an above-stated device; and
an electric motor cooperating with the stem of the device to set said stem in rotation.

BRIEF DESCRIPTION OF THE FIGURES

The invention will be better understood from reading the following description, which is provided solely by way of example and made with reference to the appended drawings, in which identical reference signs denote identical or equivalent elements, and in which:

FIGS. 2A-2D are a schematic sectional view of a cup and a stem which are part of system of FIG. 1;

FIGS. 3A to 3E are schematic views of a first and a second container illustrating a method according to the invention for mixing solutions present therein;

DETAILED DESCRIPTION OF THE INVENTION

Figure 1:
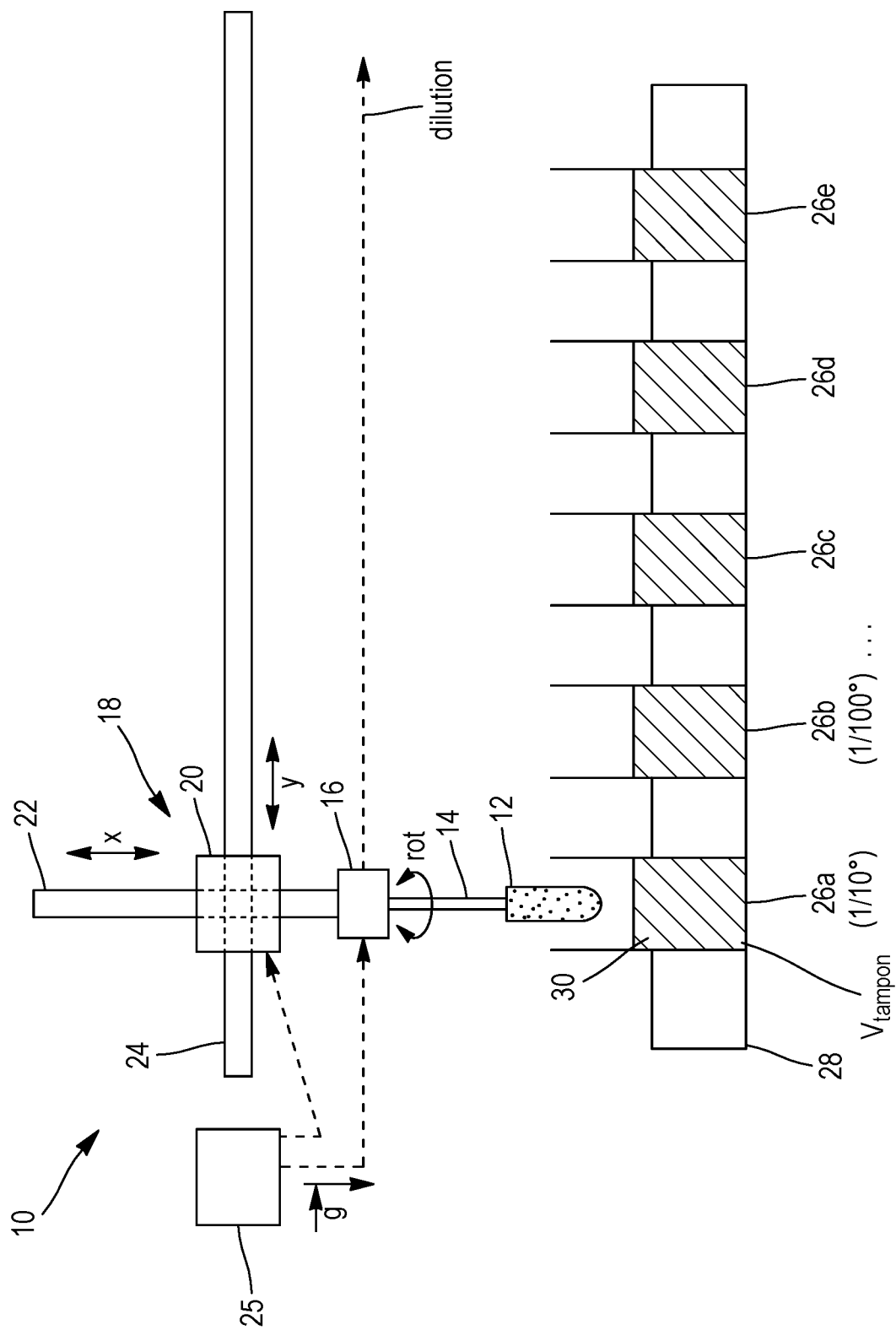
FIG. 1 is a schematic view of a system for mixing solutions according to the invention.

In FIG. 1, a system 10 for mixing solutions according to the invention comprises:
a first container 12 in the form of a cup, integral with a stem 14 in a manner described in greater detail below;
an electric motor 16, for example a direct current motor, to which the stem 14 is fastened and which is capable of setting the latter in rotation. For example, the stem 14 is clamped in a chuck or a gripper fastened to the end of the motor shaft in a manner known per se. The stem 14 can thus be detached from the motor 16 for replacement thereof or replacement of the cup 12;

a device 18 for displacing the assembly formed by the motor, the stem 14 and the cup 14 in two perpendicular axes, X and Y, for example made up of a two-axis motor 20 and two toothed rails 22, 24 known per se from the prior art. Preferably, once the system 10 has been installed and is ready to use, the X axis is parallel to the direction of gravity $\vec{g}$, the plane defined by the X and Y axes being vertical;

a control unit 25, comprising for example a microprocessor circuit, a microcontroller or a computer which actuates the motor 16 and the displacement system 18 in such a manner as to carry out the method according to the invention as described below. The unit 25 in particular comprises a computer-readable memory means which stores instructions for carrying out the method;

a set of second containers 26a-26e, or "vessels", for example identical and optionally arranged in a removable tray or rack 28 so as to displaced together;

optionally, filling means for the vessels (not shown), for example one or more wash bottles which, on command, dispense a solution into each vessel.

Each of vessels 26a-26e is dimensioned to contain the cup 12 in its entirety. More particularly, each vessel is dimensioned such that the cup 12 is entirely immersed in a predefined volume of solution 30 present in the vessel (hereafter "$V_{buffer}$"). Vessels 26a-26e are also positioned such that the displacement device 18 can entirely immerse the cup 12 in each of the vessels without causing them to overflow, including when the cup 12 is set in rotation by the motor 16. For example, each vessel is half-filled which furthermore avoids the risk of splashing during rotation of the cup.

The cup 12 advantageously has a shape chosen to avoid imprisoning air bubbles when it is immersed in a vessel, and comprises no bulge, groove or other internal volume likely to trap an air bubble when the cup is immersed empty in a filled vessel. The internal wall of the cup is in particular of a section (defined perpendicular to an axis Z) which is constant or diminishes from an upper opening 34 towards the bottom of the cup 38, for example of a cylindrical and/or conical shape (e.g. a cylinder, a cone, a cylinder extended by a cone or a cone extended by a cylinder), the lower part of the cup possibly being rounded or unrounded.

As illustrated in the sectional view of FIG. 2A, a cup 12 according to a first embodiment comprises a part having a rotational symmetry of axis Z, parallel to the X axis when the stem is fitted to the motor 16. Alternatively, the cup is of oval section, of a section forming a, preferably regular, polygon centered on the Z axis, the section being defined in a plane perpendicular to the Z axis. This part comprises a cylindrical upper part 32, provided with an opening 34 for filling and emptying an internal volume 36 of the container (hereafter "$V_{sol}$"), and a lower part 38 which is conical or frustoconical in shape. The internal wall of the cup therefore does not comprise any volume likely to trap an air bubble when it is immersed in a vessel. The wall of the cup 12 is solid, i.e. unperforated, the upper opening 34 therefore being the only fluid passage into and out of the cup 12. The shape of the lower part 38 facilitates immersion of the cup 12 in the solutions present in the vessels 26a-26e, together with wiping of the liquid present on one end 40 when the cup 12 is withdrawn from a vessel. The stem 14, for example of circular section, crosses the cup 12 via the opening 34 while being centered on the Z axis, and is fastened by the lower portion thereof to an internal wall 40 of the lower part 38. For example, the stem 14 is fastened means of an adhesive 42, the free surface 44 of which defines a leakproof bottom for the internal volume 36 and is non-angular in order to avoid imprisoning liquid (e.g. by capillarity in an angular space). The internal volume 36 is thus defined by the volume of solution which the cup 12 can contain up to the opening 34, and thus the internal volume of the cup 12, from which are subtracted the volume of the adhesive 42 and the volume of the stem present in the cup 12.

In one variant embodiment, the cup 12 is manufactured from a, preferably hydrophobic, plastics material, such as for example polypropylene or crystal polystyrene, and/or the outer surface thereof is polished which minimizes a liquid film on the outer surface of the cup, or even prevents such a film from forming, and so permits more precise control of the volume of liquid transported by the cup.

In one variant embodiment, the features of the cup 12, primarily the dimensions thereof and optionally the material from which it is made, are selected to prevent the solution it contains from spilling when the cup is tilted at an angle at least equal to 30°, said angle being the absolute angle formed between the Z axis of the cup and the direction of gravity. In particular, for an internal volume 36 of the cup of between 0.5 milliliters (ml) and 2 ml, and in particular 1 ml, the internal diameter $\Phi$ of the cup at the level of the opening 34 is between 8.5 millimeters (mm) (corresponding to an area of 57 mm$^2$) and 13 mm (corresponding to an area of 133 mm$^2$). Preferably, the diameter $\Phi$ is between 8.5 mm and 10 mm (corresponding to an area of 79 mm$^2$), which creates capillarity such that the solution remains trapped in the cup even when the latter, located outside a vessel and without being rotated, is upside down. Below 8.5 mm in diameter, the inventors observed a risk of a bubble occurring when the cup is filled, which does not facilitate the initial filling thereof by pipetting and requires a longer duration of rotation to cause the bubble to disappear. Above 13 mm in diameter, the solution present in the cup is observed to spill readily when the cup is tilted.

By selecting a diameter $\Phi$ of between 8.5 mm and 13 mm, and preferably of between 8.5 mm and 10 mm, there is therefore no need to take major precautions, or even any precautions at all, to prevent the cup from tilting or undergoing vibration when it is outside a vessel. For example, it is possible to design an automated instrument without anti-vibration means and/or without means which control the verticality of the cup as it passes from vessel to vessel. Likewise, the cup may be handled easily by a technician without spillage of the solution its contains.

Figure 2D:
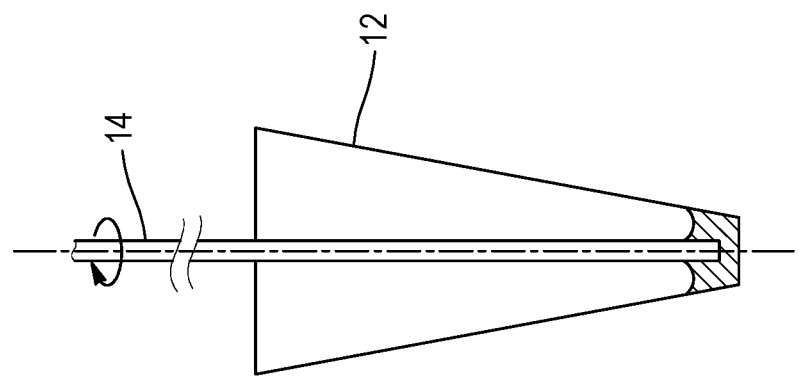
Figure 2C:
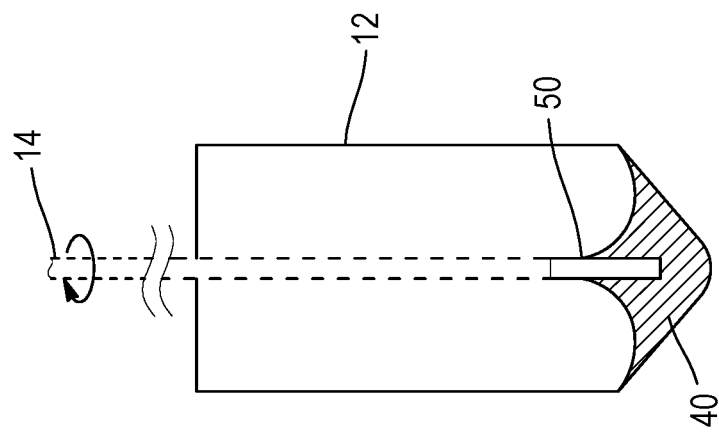
Figure 2B:
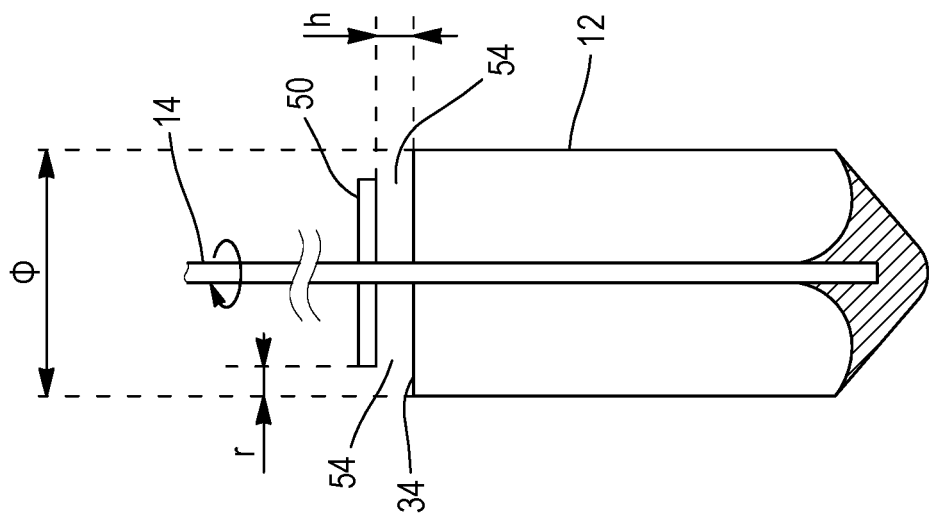

A second embodiment, illustrated in the schematic sectional view in FIG. 2B, differs from the first embodiment by the presence of a washer 50 fastened to the stem 14 above the opening 34 of cup 12 at a distance h. The washer 50, of diameter of $\Phi$-2 r and coaxial with the stem 14, therefore defines a fluid passage 54 of limited area. As previously, the dimensions of this passage are selected to limit the risk of spillage when the cup is tilted. In particular, the washer is located at a distance h of between 3 mm and 5 mm from the opening 34 and has a diameter selected so as to define a disk for passage of fluid of width r of between 3 mm and 5 mm, preferably equal to 3 mm. The washer 52 therefore makes it possible to increase the diameter $\Phi$ of the cup beyond 13 mm by preventing spillage of the solution it contains.

A cup according to a third embodiment is illustrated in the schematic sectional view of FIG. 2B. This second embodiment differs from the previous embodiments by the means for fastening the stem 14 to the cup 12. In particular, the cup 12 comprises at the bottom thereof a tube 50, for example molded in a lower solid part 38 of the cup. The tube 50 is capable of cooperating with the stem 14 which is force-fitted therein. The cup may thus be supplied alone and/or the stem may be fastened and then detached from the cup 12.

Referring to the schematic sectional view of FIG. 2D, a cup according to a fourth embodiment differs from the previous embodiments in terms of the shape of the cup. In particular, the cup 12 is frustoconical in shape, for example of circular, oval or, preferably regular, polyhedral section which facilitates homogenization of viscous and pasty solutions, as well as extraction of the solution present in the cup.

In a fifth embodiment, the cup is provided on its external face with one or more protrusion(s), for example one or more fin(s) or blades, in order to facilitate and/or accelerate homogenization. While the inventors have observed that a cup with a "smooth" outer face (i.e. which lacks protrusions) is sufficient for quickly and thoroughly homogenizing a mixture of a volume of less than 100 mm, the presence of protrusions substantially facilitates and accelerates homogenization beyond this volume. Alternatively, the cup is of oval section in a plane perpendicular to the Z axis, this shape facilitating mixing.

A decimal serial dilution method for a solution carried out by the system which has just been described is now described in relation to FIGS. 3A-3E.

In a first method step, the cup 12 is filled with a solution for dilution, or "initial" solution. For example, the cup 12 is immersed empty in a vessel, and advantageously set in rotation to remove any possible bubble attached to the wall, or the solution is poured with the assistance of a pipette. Vessels 26a-26e are furthermore filled with a dilution buffer. In particular for a decimal dilution, the cup 12 is entirely filled and therefore contains a volume $V_{sol}$ of solution for dilution, and each of vessels 26a-26e are filled with a volume of dilution buffer $V_{buffer}=9\times V_{sol}$.

The method proceeds by successive mixing operations of the solution present the cup 12 with the dilution buffers of vessels 26a-26e, for example in the order shown by the "dilution" arrow in FIG. 1. In particular, for any vessel "26" among containers 26a-26e:

a) the unit 25 actuates the placement device 18 such that the latter positions the cup 12 above said vessel 26 with the rotational motor 16 at a standstill (FIG. 3A);

b) the unit 25 then actuates the device 18 to lower the cup 12 until it is completely immersed in the dilution buffer present in the vessel 26 (FIG. 3B);

c) once the cup 12 is translationally immobilized (motor 20 at a standstill), the unit 25 starts the motor 16, setting the cup 12 in rotation (FIG. 3C). A centrifugal force is thus created which ejects the solution present in the cup 12. Rotation of the cup 12 furthermore has the effect of agitating the contents of the container 26, so resulting in homogeneous mixing of the solution of the cup 12 and of the dilution buffer of the vessel 26, said mixing wetting and thus filling the cup 12;

d) the unit 25 then deactivates the rotational motor 16 then actuates the displacement device 18 to raise the cup 12 back up to remove it from the vessel 26 (FIG. 3D;

e) the device 18 is then actuated by the unit 25 to displace the cup 12 towards the following vessel 26 in the list (FIG. 3E).

A new dilution sequence, as just described, is then carried out without the cup 12 being emptied between two dilutions.

Advantageously, the lifting speed of the cup 12 is selected so as to avoid the occurrence of a drop of solution on the tip of the cup. This speed is for example determined empirically by testing a plurality of speeds and selecting the maximum speed which avoids said drop, said speed being saved in the unit 25 for actuation of the displacement device 18.

To ensure ease of mixing, stirring of the cup, i.e. a movement involving rotation about an axis perpendicular to the Z axis, can also be provided.

Once the serial dilution process is complete, vessels 26a-26e are thus obtained which respectively contain a dilution equal or close to $1/10^{th}$ of the initial solution (container 26a), a dilution equal or close to $1/100^{th}$ of the initial solution (container 26b), a dilution equal or close to $1/1000^{th}$ of the initial solution (container 26c), etc. A laboratory technician can thus extract the rack 28 from the solution system and have a decimal serial dilution of the solution initially present in the cup 12 at his/her disposal. Optionally, the final solution present in the cup 12 can also be recovered, said solution already being calibrated to the volume $V_{sol}$.

Some numerical examples:
- the volume $V_{sol}$ of the cup is equal to 1 milliliter and the speed of rotation (saved in the unit 25 for actuating the motor 16) between 3800 and 5000 revolutions/minute, and preferably equal to 4600 revolutions/minute;
- the volume $V_{sol}$ of the cup is equal to 2 milliliters and the speed of rotation (saved in the unit 25 for actuating the motor 16) between 1900 and 4600 revolutions/minute, and preferably equal to 3900 revolutions/minute;
- the volume $V_{sol}$ of the cup is equal to 5 milliliters and the speed of rotation (saved in the unit 25 for actuating the motor 16) between 1000 and 3000 revolutions/minute, and preferably equal to 2000 revolutions/minute.

An example of a dilution method has been described. The present invention applies to any kind of mixing between at least the solution initially present in the cup and a solution present in a container. For example, complex mixing operations of the solution present in the cup with a plurality of reagents and/or buffers may be carried out according to the invention.

Identical vessels have been described. Alternatively, the vessels have different volumes and/or shapes, which in particular makes it possible to increase the dilution range.

A decimal dilution has been described. The invention applies to any kind of dilution. For example, different volumes of dilution buffer may be placed in the vessels in order, for example, to increase the dilution range.

Likewise, a single cup has been described. Alternatively, a plurality of cups may be used to perform mixing operations, e.g. dilutions, in parallel.

A cup having rotational symmetry has been described. Alternatively, the cup has any cross-section (i.e. section perpendicular to the Z axis), for example oval or polygonal (e.g. square). The diameter ranges are then replaced by the above-described area ranges.

An electric motor for setting the cup in rotation has been described. Obviously, any kind of means capable of achieving such setting in rotation is suitable.

A displacement system which displaces the cup has been described. Alternatively, a system which displaces the vessels or which displaces the vessels and the cup is provided.

Figure 4:
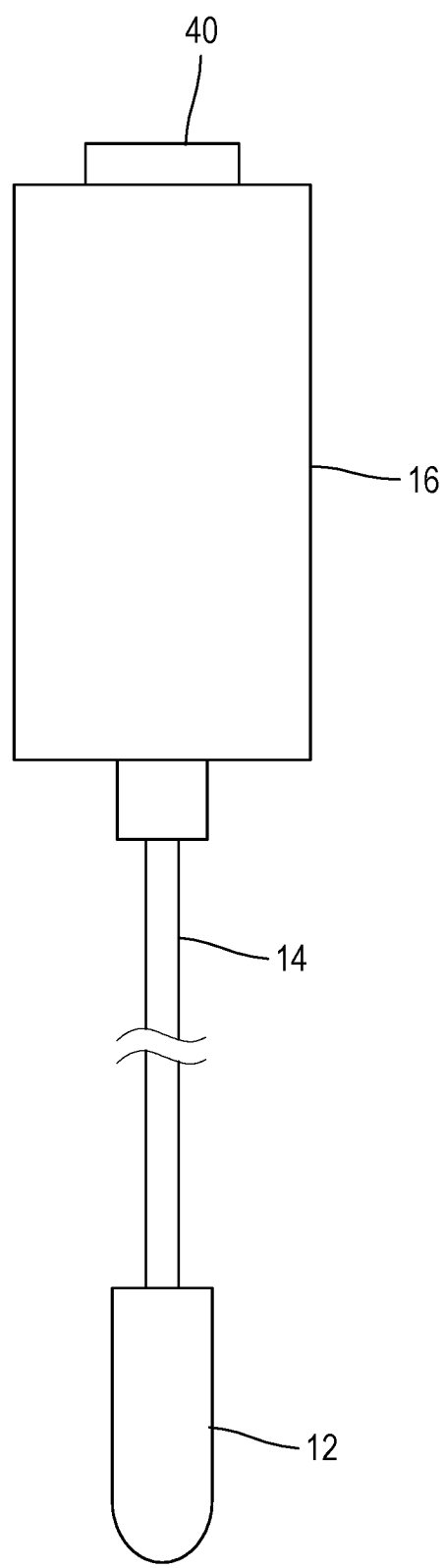
FIG. 4 is a schematic view of a manual mixing device according to the invention.

An automated instrument which automatically carries out the mixing operations has been described. The invention also provides a portable device handled by a technician as schematically illustrated in FIG. 4. Such a device comprises a motor 16 manually actuatable by means of a pushbutton 60 and in which is fastened the stem 14 to set the latter into rotation. For example, the stem 14 is clamped in a chuck or a gripper fastened to the end of the motor shaft in a manner known per se. The stem 14 can thus be detached from the motor 16 for replacement thereof or replacement of the cup 12. The motor 16, for example a direct current motor, comprises a battery and an actuation circuit which actuates rotation at a predetermined speed. This type of device is well-known per se, for example from the field of hand-held screwdrivers and drills.

For example, a technician arranges one or more vessels containing dilution solutions on a work surface, fills the cup 12 with solution for dilution and then manually carries out the steps described in relation to FIG. 3.

The present invention thus has the following advantages:
- automation of mixing operations, in particular dilutions;
- high volumetric precision of the mixed solutions, suitable for mixing is diluting greater than or equal to milliliter volumes, in particular for volumes of between 1 milliliter and 5 milliliters;
- low risk of inter-container contamination during dilutions;
- effective homogenization of solutions, in particular dilutions.

The invention claimed is:

1. A system for mixing solutions comprising:
   a first container configured to contain a solution, the first container extending from a first end to a second end along a longitudinal axis, and comprising:
   (i) an upper part that is cylindrical and is disposed at the first end,
   (ii) an opening in the upper part, an internal volume of the first container being configured to be filled and emptied through the opening, the opening being an only fluid passage in and out of the first container,
   (iii) a lower part that is conical or frustoconical and is disposed at the second end, and
   (iv) a solid internal wall that is cylindrical and/or conical, and
   a second container configured to contain a solution, the second container being configured to entirely contain the first container;
   a displacement device including a motor, the displacement device being configured to displace the first container and/or the second container so as to entirely immerse the first container in the second container such that the first end of the first container faces in a direction towards a surface of the solution contained in the second container and away from the second end; and
   a rotational driver of the first container that is configured to mix the solution present in the first container with the solution present in the second container when the first container is entirely immersed in the solution present in the second container.

2. The system as claimed in claim 1, wherein the internal volume of the first container for filling with solution is between 1 milliliter and 5 milliliters.

3. The system as claimed in claim 1, wherein:
   the internal volume for introducing the solution is between 1 milliliter and 2 milliliters; and
   the opening has an area of between 57 mm$^2$ and 133 mm$^2$.

4. The system as claimed in claim 1, comprising a plurality of second containers, the displacement device being configured to immerse the first container in succession in the plurality of second containers.

5. The system as claimed in claim 1, wherein the first container is filled with a solution for dilution and the second container is filled with a dilution buffer.

6. The system as claimed in claim 1, wherein the rotational driver comprises:
   a stem passing through the opening in the first container, the stem being integral with the internal wall of the first container; and
   a rotational motor connected to a second end of the stem and configured to drive the stem in rotation.

7. The system as claimed in claim 6, wherein the stem is removably connected to the rotational motor.

8. The system as claimed in claim 6, wherein the first container comprises an axis of symmetry on which the stem is positioned.

9. The system as claimed in claim 6, wherein the stem comprises a washer arranged above the first container.

10. The system as claimed in claim 1, wherein the first container comprises a part with rotational symmetry and a frustoconical or conical portion in a lower part.

11. The system as claimed in claim 1, wherein the first container is made of plastics material.

12. A method for mixing solutions, the method comprising:
   providing a system comprising:
      a first container configured to contain a solution, the first container extending from a first end to a second end along a longitudinal axis, and comprising:
         (i) an upper part that is cylindrical and is disposed at the first end,
         (ii) an opening in the upper part, an internal volume of the first container being configured to be filled and emptied through the opening, the opening being an only fluid passage in and out of the first container,
         (iii) a lower part that is conical or frustoconical and is disposed at the second end, and
         (iv) a solid internal wall that is cylindrical and/or conical, and
      a second container configured to contain a solution, the second container being configured to entirely contain the first container;
      a displacement device including a motor, the displacement device being configured to displace the first container and/or the second container so as to entirely immerse the first container in the second container such that the first end of the first container faces in a direction towards a surface of the solution contained in the second container and away from the second end; and
      a rotational driver of the first container that is configured to mix the solution present in the first container with the solution present in the second container when the first container is entirely immersed in the solution present in the second container;
   filling the first container and the second container with solutions for mixing; and
   mixing the solution present in the second container and the solution present in the first container by:
      placing the first container entirely in the second container such that the first container is entirely immersed in the solution present in the second container; and
      setting the first container in rotation and/or stirring the first container so as to mix the solutions present in the first container and the second container.

13. The method as claimed in claim 12, wherein the solution present in the first container is mixed in succession with a plurality of second containers.

14. The method as claimed in claim 12, wherein the second container is filled with a volume of solution, and a volumetric capacity of the first container is equal to $\frac{1}{9}^{th}$ of the volume of solution.

15. The method as claimed in claim 12, wherein the first container is filled with a solution for dilution and the second container is filled with a dilution buffer.

16. A device for mixing solutions comprising:
   a first container extending from a first end to a second end along a longitudinal axis, and comprising:
      (i) an upper part that is cylindrical and is disposed at the first end,
      (ii) an opening in the upper part, an internal volume of the first container being configured to be filled and emptied through the opening, the opening being an only fluid passage in and out of the first container,
      (iii) a lower part that is conical or frustoconical and is disposed at the second end, and
      (iv) a solid internal wall that is cylindrical and/or conical; and
   a stem passing through the opening of the first container, the stem being integral with the internal wall of the first container and being configured to be connected to a motor to set the stem in rotation.

* * * * *